(12) United States Patent
Grosvenor (10) Patent No.: US 11,962,403 B2
(45) Date of Patent: Apr. 16, 2024

(54) METHOD AND APPARATUS FOR NETWORK TIME SYNCING

(71) Applicant: CISCO TECHNOLOGY, INC., San Jose, CA (US)

(72) Inventor: Matthew Grosvenor, Lane Cove (AU)

(73) Assignee: CISCO TECHNOLOGY, INC., San Jose, CA (US)

( * ) Notice: Subject to any disclaimer, the term of this patent is extended or adjusted under 35 U.S.C. 154(b) by 103 days.

(21) Appl. No.: 17/441,749

(22) PCT Filed: Mar. 27, 2020

(86) PCT No.: PCT/IB2020/052899
§ 371 (c)(1),
(2) Date: Sep. 22, 2021

(87) PCT Pub. No.: WO2020/201950
PCT Pub. Date: Oct. 8, 2020

(65) Prior Publication Data
US 2022/0200721 A1    Jun. 23, 2022

(30) Foreign Application Priority Data
Apr. 1, 2019    (AU) ................................ 2019901104

(51) Int. Cl.
*H04J 3/06*    (2006.01)
*H04L 7/00*    (2006.01)
(52) U.S. Cl.
CPC .......... *H04J 3/0667* (2013.01); *H04J 3/0682* (2013.01); *H04L 7/0033* (2013.01); *H04L 7/0075* (2013.01)

(58) Field of Classification Search
CPC ..... H04J 3/0667; H04J 3/0682; H04L 7/0033; H04L 7/0075; H04L 69/32; H04L 69/321; H04L 69/323; H04L 69/326
See application file for complete search history.

(56) References Cited

U.S. PATENT DOCUMENTS 5,457,428 A    10/1995    Alder et al.
5,953,345 A    9/1999    Findlater et al.
(Continued)

FOREIGN PATENT DOCUMENTS

AU    2013101670 B4    1/2014
EP    1564919 B1    10/2006
(Continued)

OTHER PUBLICATIONS

International Search Report and Written Opinion in counterpart International Application No. PCT/IB2020/052899, dated Jul. 27, 2020, 15 pages.
(Continued)

*Primary Examiner* — Alpus Hsu (57) ABSTRACT

A method of operating a network having one or more nodes which are in communication with a server, the server including or being in communication with a high precision time source, to estimate a time delay between the server and each node is provided. The method includes initiating a delay request from the server which is transported over a physical layer to the node, the server receiving a delay response from the node receiving the delay request, wherein a timestamp for the delay request and a timestamp for the delay response are times recorded from the high precision time source, wherein the time delay is estimated from half of a time difference between the timestamps.

20 Claims, 7 Drawing Sheets

(56) References Cited

U.S. PATENT DOCUMENTS

| | | | |
|---|---|---|---|
| 6,144,714 A | | 11/2000 | Bleiweiss et al. |
| 6,278,710 B1 | | 8/2001 | Eidson |
| 8,036,202 B2 | | 10/2011 | Biederman et al. |
| 8,598,910 B1 | | 12/2013 | Leshchuk et al. |
| 8,949,448 B1 | | 2/2015 | Saxtorph |
| 8,954,609 B1 | * | 2/2015 | Holleman .............. H04J 3/0667 709/227 |
| 9,112,631 B2 | * | 8/2015 | Aweya .................. H04J 3/0664 |
| 9,112,632 B2 | | 8/2015 | Finn |
| 9,167,545 B2 | | 10/2015 | Matsunaga |
| 9,268,888 B1 | | 2/2016 | Leong et al. |
| 9,335,785 B2 | * | 5/2016 | Mihelič ................. H04J 3/0667 |
| 9,519,047 B2 | * | 12/2016 | Davis ........................ G01S 5/10 |
| 9,651,984 B2 | * | 5/2017 | McGaughey ........... H04L 67/01 |
| 9,912,465 B2 | * | 3/2018 | Mihelic .................. H04J 3/0667 |
| 2002/0073228 A1 | | 6/2002 | Cognet et al. |
| 2003/0235216 A1 | | 12/2003 | Gustin |
| 2005/0050203 A1 | | 3/2005 | Chattopadhyay et al. |
| 2005/0207387 A1 | | 9/2005 | Middleton et al. |
| 2005/0286507 A1 | | 12/2005 | Osterling et al. |
| 2006/0007960 A1 | | 1/2006 | Liu et al. |
| 2007/0100570 A1 | | 5/2007 | Ku |
| 2008/0273521 A1 | | 11/2008 | Shao et al. |
| 2010/0074383 A1 | | 3/2010 | Lee et al. |
| 2010/0150288 A1 | | 6/2010 | Zhu et al. |
| 2011/0035511 A1 | * | 2/2011 | Biederman .............. G04G 7/00 709/248 |
| 2011/0075685 A1 | | 3/2011 | Xu et al. |
| 2012/0139597 A1 | | 6/2012 | Blondel et al. |
| 2013/0003757 A1 | | 1/2013 | Boatright et al. |
| 2013/0343409 A1 | | 12/2013 | Haulin |
| 2014/0132837 A1 | | 5/2014 | Ye et al. |
| 2015/0117251 A1 | * | 4/2015 | Lien ................... H04L 43/0888 370/253 |
| 2015/0134864 A1 | | 5/2015 | Foster |
| 2015/0163000 A1 | | 6/2015 | Aweya |
| 2016/0020985 A1 | | 1/2016 | Swartzentruber et al. |
| 2016/0043823 A1 | | 2/2016 | Zhao et al. |
| 2016/0315840 A1 | | 10/2016 | Huang |
| 2016/0329979 A1 | | 11/2016 | Hansson et al. |
| 2017/0085422 A1 | | 3/2017 | Chapman |
| 2018/0013508 A1 | * | 1/2018 | Rabinovich ........... H04J 3/0667 |
| 2018/0107579 A1 | | 4/2018 | Chapman |
| 2018/0198598 A1 | * | 7/2018 | Mihelic ................. H04L 7/0033 |
| 2018/0198599 A1 | * | 7/2018 | Mihelic ..................... G06F 1/10 |
| 2018/0287725 A1 | * | 10/2018 | Rabinovich ........... H04J 3/0673 |

FOREIGN PATENT DOCUMENTS

| | | |
|---|---|---|
| WO | 2009029339 A1 | 3/2009 |
| WO | 2011/074529 A1 | 6/2011 |

OTHER PUBLICATIONS

Maciej Lipinski et al., "Performance results of the first White Rabbit installation for CNGS time transfer", 2012 IEEE International Symposium on Precision Clock Synchronization for Measurement, Control and Communication Proceedings. IEEE, Apr. 2012, 6 pages.

Pedro Moreira et al., "Distributed DDS in a White Rabbit Network: An IEEE 1588 Application", 2012 IEEE International Symposium on Precision Clock Synchronization for Measurement, Control and Communication Proceedings. IEEE, Sep. 2012, 6 pages.

Maciej Lipinski et al. "Reliability in A White Rabbit Network." Conf. Proc.. vol. 111010. No. CERN-ATS-2011-195., 13th International Conference on Accelerator and Large Experimental Physics Control Systems, Oct. 2011, 4 pages.

J. Serrano et al., "The White Rabbit Project", Proceedings of IBIC2013, Sep. 2013, 7 pages.

J. Serrano et al., "White Rabbit Status and Prospects", No. CERN-ACC-2013-0231, Oct. 2013, 4 pages.

M. Brückner et al., "A White Rabbit setup for sub-nsec synchronization, timestamping and time calibration in large scale astroparticle physics experiments", ICRC, vol. 33, Jul. 2013, 4 pages.

J. Serrano et al., "The White Rabbit Project", No. CERN-ATS-2009-096, Oct. 2009, 3 pages.

Pedro Moreira et al., "White Rabbit: Sub-Nanosecond Timing Distribution over Ethernet", 2009 International Symposium on Precision Clock Synchronization for Measurement, Control and Communication, IEEE, Oct. 2009, 5 pages.

M. Brückner, et al. "Results from the WhiteRabbit sub-nsec time synchronization setup at HISCORE-Tunka." Proceedings of the 33rd International Cosmic Rays Conference, ICRC 2013, Jul. 2013, 4 pages.

Pietro Fezzardi et al., "PPSi—A Free Software PTP Implementation", 2014 IEEE International Symposium on Precision Clock Synchronization for Measurement, Control, and Communication (Ispcs), IEEE, 2014, 6 pages.

Maciej Lipiński et al. "White rabbit: A PTP application for robust sub-nanosecond synchronization", 2011 IEEE International Symposium on Precision Clock Synchronization for Measurement, Control and Communication, IEEE, Sep. 2011, 6 pages.

M. Lipiński et al., "White Rabbit Applications and Enhancements", Precision Clock Synchronization for Measurement, Control, and Communication (ISPCS), 2018 IEEE International Symposium Proceedings 978-1-5386-4262-7, Oct. 3-5, 2018, 8 pages.

Opher Ronen, "Enhanced synchronization accuracy in IEEE1588," 2015 IEEE International Symposium on Precision Clock Synchronization for Measurement, Control, and Communication (ISPCS), IEEE, Oct. 2015, 7 pages.

V. Di Capua et al., "Real-Time Magnetic Measurement Monitoring under cRIO-LabVIEW Based Platform", ISPCS, Sep. 2018, 5 pages.

Mattia Rizzi et al., "White Rabbit clock characteristics", 2016 IEEE International Symposium on Precision Clock Synchronization for Measurement, Control, and Communication (ISPCS), IEEE, Sep. 2016, 6 pages.

Grzegorz Daniluk et al., "White Rabbit: Sub-Nanosecond Synchronization for Embedded Systems", Proceedings of the 43rd Annual Precise Time and Time Interval Systems and Applications Meeting, Nov. 2011, 15 pages.

Javier Serrano, "Small or medium-scale focused research project (STREP) proposal ICT Call 5", FP7-ICT-2009-5, STREP proposal White Rabbit, Oct. 23, 2009, V. 1, 80 pages.

IEEE, "IEEE Standard for a Precision Clock Synchronization Protocol for Networked Measurement and Control Systems", IEEE Std 1588™-2008, Jul. 24, 2008, 289 pages.

Cota, Emilio G. et al., "White Rabbit Specification: Draft for Comments", Version 2.0, Jul. 2011, 69 pages.

Daniluk, Grzegorz, "White Rabbit calibration procedure", Version 1.1, Nov. 9, 2015, 32 pages.

Jansweijer, P.P.M. et al., "Measuring propagation delay over a 1.25 Gbps bidirectional data link", National Institute for Subatomic Physics, The Netherlands, May 31, 2010, 24 pages.

Moreira, Pedro et al., "Digital Dual Mixer Time Difference for Sub-Nanosecond Time Synchronization in Ethernet", Frequency Control Symposium, Jun. 2010, 5 pages.

Wlostowski, Tomasz et al., "Precise time and frequency transfer in a White Rabbit network", Apr. 2011, 98 pages.

Eidson, John C., "Measurement, Control, and Communication Using IEEE 1588," Chapters 3, 4, 5 & 8), ISBN 978-1-84628-251-5, Mar. 9, 2006, 161 pages.

Holmeide, Øyvind et al., "Synchronised Switching", IET Computing & Control Engineering, Apr./May 2006, 7 pages.

Lee, Kang et al., "Workshop on IEEE-1588, Standard for a Precision Clock Synchronization Protocol for Networked Measurement and Control Systems", Sep. 24, 2003, 154 pages.

\* cited by examiner

Figure 1

(Prior Art)

METHOD AND APPARATUS FOR NETWORK TIME SYNCING

TECHNICAL FIELD

This disclosure relates to the time syncing operation which occurs in a communication network, where there is a time sync requirement between host computing systems connected to the network and the server for the network.

BACKGROUND ART

The tradition time protocol for time synchronisation over standard Ethernet networks is the Precision Time Protocol (PTP). PTP includes the host computing system issuing a delay request, so as to determine the delay between itself and the grandmaster (i.e. timekeeping server). Another component is the actual time synchronisation, where the grandmaster issues a timestamp to the host computing systems, or nodes, connected to the network. Each host computing system can then perform a time determination based on the timestamp received in the synchronisation and the estimated delay it would have taken for the timestamp to be routed from the grandmaster to the host computing system.

Currently, very high precision time synchronization is not available in standard Ethernet networks. To improve the precision of time synchronization, the "White Rabbit" protocol is built over Synchronous Ethernet, which is effectively a different standard. However, Synchronous Ethernet is incompatible with the network interface cards and switches of the standard Ethernet. A barrier to entry thus exists for customers who wish to adopt the "White Rabbit" standard, as it requires specialist equipment at each customer site, to use the protocol. All equipment needs to be specific replaced for the protocol.

It is desirable to have a protocol which improves, at least in part, the precision of the PTP, while minimising the requirement for new network equipment.

It is to be understood that, if any prior art is referred to herein, such reference does not constitute an admission that the prior art forms a part of the common general knowledge in the art, in Australia or any other country.

SUMMARY

In a first aspect, the invention provides a method of operating a network, the network having one or more nodes which are in communication with a server, the server including or being in communication with a high precision time source, to estimate a time delay between the server and each node, comprising initiating a delay request from the server which is transported over a physical layer to the node, the server receiving a delay response from the node receiving the delay request, wherein a timestamp for the delay request and a timestamp for the delay response are times recorded from the high precision time source, wherein the time delay is estimated from half of a time difference between the timestamps.

Each node can include a passive reflector which is adapted to both passively reflect data from the server and let received data through to the node, wherein the delay response is a passive reflection of the delay request.

The passive reflector can be built into a network interface card at the node.

The passive reflector can be embedded into a component insertable or otherwise connectable to a network interface card at the node.

The component can be a type of a small form pluggable.

The physical layer can be configurable to provide a physical connection for bidirectional communication between the transport layer and one of the one or more nodes at a time, and one-way communication from the transport layer to the remaining one(s) of the one or more nodes.

Estimating a time delay between the server and each node can include configurating the physical layer for transport of time protocol data between the server and each node, sending the delay request, and receiving the delay response from the node, one node at a time.

The physical layer can comprise a matrix of switches and/or optical splitters.

The method can include issuing a time synchronisation request to the one or more nodes.

The time synchronisation request can be handled by a time synchronisation logic.

The server can store the time delay for each node, and the time synchronisation logic can be a slave clock logic.

The time synchronisation logic can be implemented in hardware connectable or embedded in network interface cards at the nodes.

The time synchronisation logic can be implemented in software.

In a second aspect, the invention provides a method of operating a network, the network having one or more nodes which are in communication with a server, the server including or being in communication with a high precision time source, to estimate a time delay between the server and each node, wherein a time protocol data transport between the server and the one or more nodes is enabled over a reconfigurable physical layer, which is reconfigurable to provide a physical connection, over which bidirectional communication between the physical layer and the nodes is enabled, one node at a time.

In a third aspect, the invention provides a method of operating a network, the network having one or more nodes which are in communication with a server, the server including or being in communication with a high precision time source, to estimate a time delay between the server and each node. The method comprises, for each node, initiating a delay request from one of the server and the node, which is transported over a physical layer to the other one of the server and the node, the other one of the server and the node then initiating a delay response after receiving the delay request, wherein a timestamp for the delay request and a timestamp for the delay response are times recorded from the high precision time source, wherein the time delay is estimated from half of a time difference between the timestamps, wherein the delay response is a passive reflection of the delay request.

In a fourth aspect, the invention provides an adapter for allowing a device to access a shared bus of a network. The adapter comprises an interface device unit configured to receive incoming packets from the bus and output outgoing packets to the bus. It also comprises a passive reflector to reflect incoming packets back to the bus.

The passive reflector can be embedded in the interface device.

The passive reflector can be embedded in a component which is insertable into or connectable to the interface device.

In a fifth aspect, the invention provides an adapter for allowing a device to access a shared bus of a network. The adapter comprises an interface device configured to receive incoming packets from the bus and output outgoing packets to the bus. It also comprises a time synchronisation logic module which is a slave clock module to a grandmaster time module of the network.

BRIEF DESCRIPTION OF THE DRAWINGS

Embodiments will now be described by way of example only, with reference to the accompanying drawings in which.

DETAILED DESCRIPTION

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Figure 1:
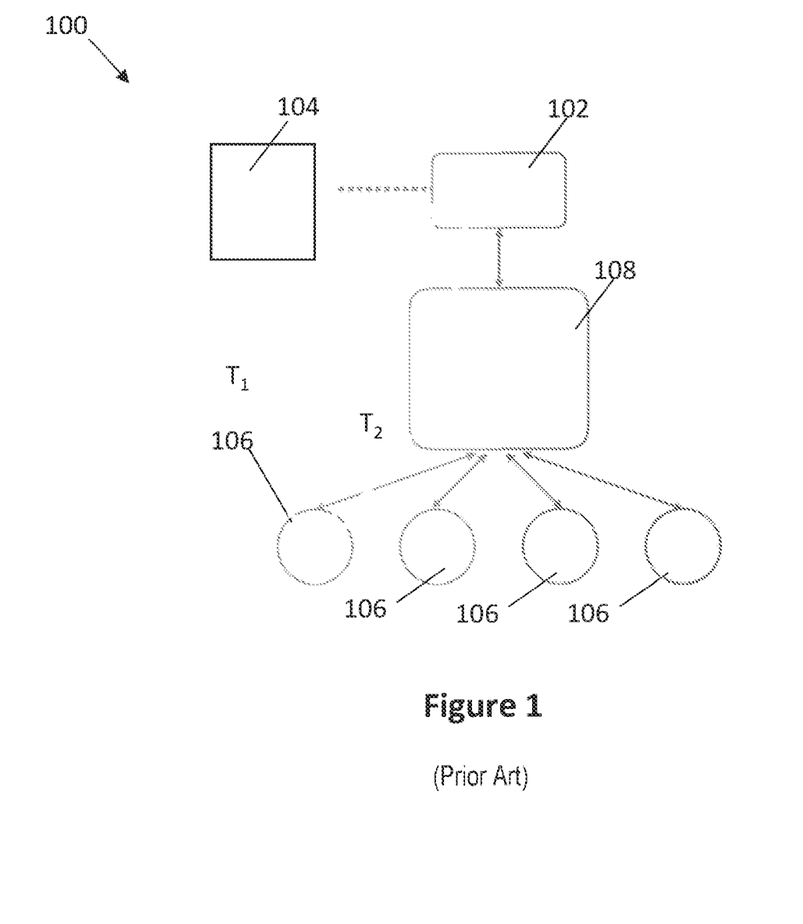
FIG. 1 is a is a schematic depicting a traditional Precision Time Protocol.

FIG. 1 is a schematic depicting a traditional Precision Time Protocol (PTP) 100. The grandmaster 102 is the server component which includes or is in communication with a time source 104 which generates a "true" time or an accepted standard of true time. The time source 104 is different depending on the specific implementation, but can be from a global positioning system (GPS) module, a pulse-per-second (PPS) signal, a crystal oscillator, etc. The grandmaster 102 is adapted to be in bidirectional communication with a data link layer 108 which acts as a message distribution layer. The data link layer 108 is adapted to be in bidirectional communication with one or more host computing systems, or nodes 106. Thus, the communication between the grandmaster 102 and the host computing systems 106 is facilitated by or performed over the data link layer 108.

In the prior art protocol, the host computing system 106, from time to time, issues a "delay request" which is sent over the data link layer 108 to the grandmaster 102. The time at which the delay request is sent, $T_1$, as measured by the local clock on the host computing system 106, is recorded. The grandmaster 102, upon receipt of the delay request, issues a delay response message to the host computing system 106 from which the delay request was generated. The time at which the delay response is received by the host computing system, $T_2$, as measured by the local clock on the host computing system 106, is also recorded. The "round trip" delay is therefore $T_2-T_1$. The one-way delay, estimated for data traffic from the host computing system to the grandmaster, or vice versa, is ½ $(T_2-T_1)$.

The grandmaster 102 is adapted to send out synchronisation requests—being an instruction for the host computing systems 106 to synchronise their time with an incoming timestamp $T_3$ (not shown). The host computing systems 106 then each set the time to $T_3$ plus the delay calculated for that host computing system 106.

In the prior art, the connection layer between the grandmaster 102 and the host computing systems 106 is the data link layer 108, with reference to the Open Systems Interconnection Model (OSI model). The OSI model is known in the art.

Figure 2:
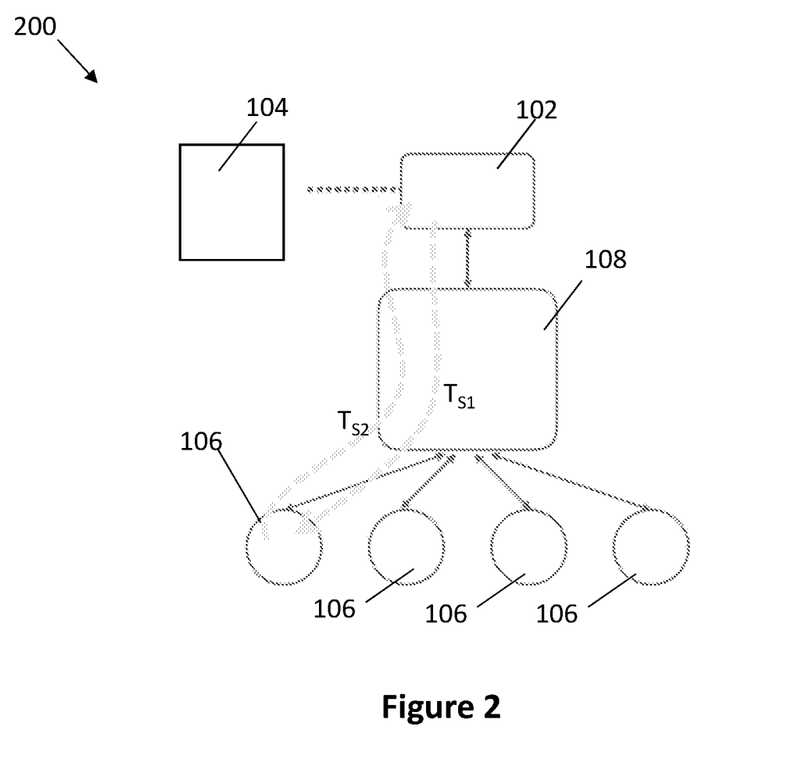
FIG. 2 is a is a schematic depicting a High Precision Time Protocol in accordance with one embodiment of the present invention.

An improved time synchronisation protocol 200 according to one embodiment of the present invention is shown in FIG. 2. In this embodiment, the delay request is initiated by the grandmaster 102, and includes the timestamp $T_{S1}$. When the host computing system 106 receives the request, it generates a delay response and transmits the delay response back to the grandmaster 102. Upon receiving the delay response, the grandmaster 102 records the time the receipt with the timestamp $T_{S2}$. The delay is thus calculated as ½ $(T_{S2}-T_{S1})$. The timestamps $T_{S1}$ and $T_{S2}$ are generated using the grandmaster's time source 104. They are of a higher precision compared the timestamps $T_1$ and $T_2$ taken using the local clocks on the host computing systems. The delay which is calculated is therefore of an improved precision. This particular embodiment does not require any modification of the equipment connected to the network.

It is preferred that a single message type is used, for both measuring the network delay (i.e. the delay request and the delay response messages), and for sending the current time (sync) messages, and where required for sending the "follow up" message with the timestamp for synchronisation. The message type can be for example, the same as the message type used by the conventional PTP to send the time synchronisation message. Optionally, these messages are layered over standard PTP messages for backwards compatibility.

With reference to FIG. 1, the data link layer 108 performs an aggregation of the delay request messages, and determine data routing for the messages, where queuing potentially occurs, degrading the overall synchronisation quality. There is therefore a "jitter" which is inherently associated with the data transport over the data link layer 108, which contributes to a lessening in the accuracy or precision of the time synchronisation process.

Figure 3:
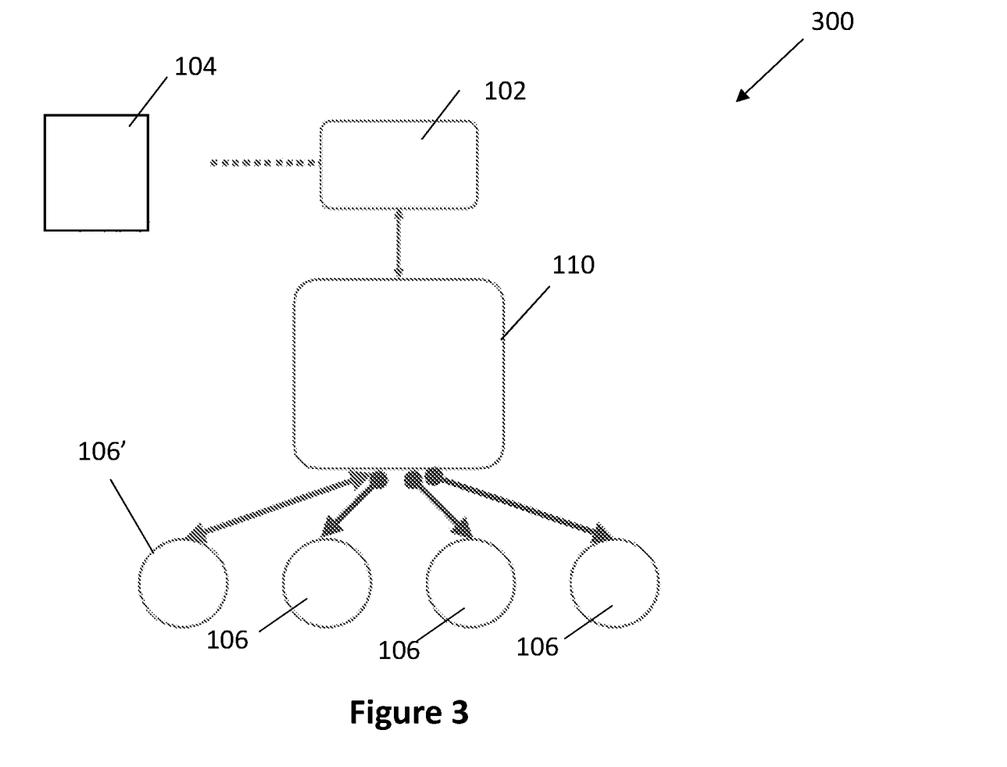
FIG. 3 is a is a schematic depicting a High Precision Time Protocol in accordance with another embodiment of the present invention.

An improved time synchronisation protocol 300 according to another embodiment of the present invention is shown in FIG. 3. In this embodiment, the communication layer, being an intermediate layer between the grandmaster 102 and the host computing system 106, is a physical layer 110, i.e. layer "1" with reference to the OSI model. The physical layer 110 will be used to enable time protocol data transport. The physical layer 110 is configurable, comprising a matrix of switches and/or broadcasting optical splitters.

The switches used for the proposed physical layer 110 are the type disclosed in WO/2015/179895, the contents of which are incorporated herein. The switches in the physical layer 110 are "crosspoint" switches which connect ports physically, rather than conventional ethernet switches. Thus, the layer "1" fabric (i.e. physical layer) 110 creates physical channels of communication, and does not perform any higher level interpretation as to the routing of the data packet.

The physical layer 110 is configurable for bidirectional communication with one host computing system 106 at a time. The host computing system for which the physical layer 110 is configured to enable bidirectional communication is referenced 106'. The remaining host computing systems 106 connected to the network are able to receive data from the physical layer 110, but are not able to send data to the physical layer 110.

The delay estimate process needs to be performed for each node (host computing system) connected to the network. Thus, once the delay response from the host computing system 106' is received by the grandmaster 102, the physical layer 110 will be reconfigured to enable bidirectional communication with the next host computing system. The reconfiguration is performed by the grandmaster 102.

Using the layer "1" fabric 110 to distribute the messages, data transport jitter which would otherwise occur in the data link layer 108 is reduced or avoided. By using, in particular, the physical switches which connect ports and do not interpret data packets, the jitter is avoided. Minimising or avoiding the jitter over the physical layer 110 acting as the message distribution layer enables an improvement of the time synchronisation accuracy.

Therefore, the transport of the delay messages, delay responses, time synchronisation requests, and where applicable the follow up messages to the synchronisation requests, occurs over the physical layer 110. The performance of the tasks associated with these messages will be improved, i.e. done with a better time precision.

Selectively configuring the layer "1" fabric 110 (e.g. via a matrix switch or selectable optical switch), so that the return messages can be received by the grandmaster 102 from individual nodes (i.e. host computing systems) 106 can be a slower process, relative to the prior art process where multiple nodes 106 can initiate and send delay requests. However, the delay request initiation occurs infrequently, and therefore does not affect the critical distribution of data.

Figure 4:
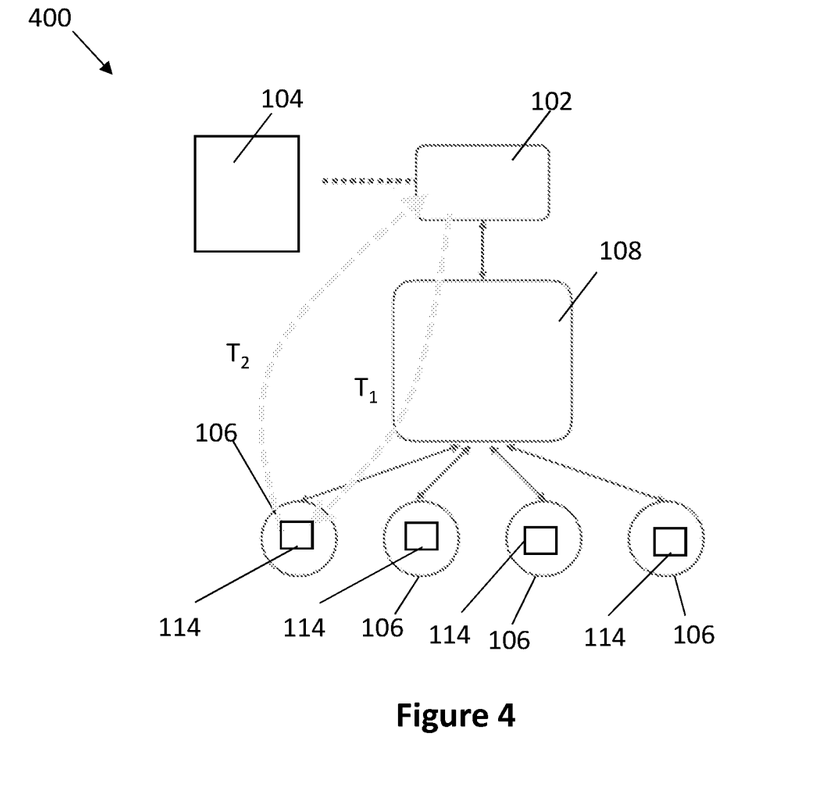
FIG. 4 is a is a schematic depicting a High Precision Time Protocol in accordance with another embodiment of the present invention.

FIG. 4 depicts the protocol in accordance with a further embodiment of the invention. This embodiment is similar to the embodiments shown in FIG. 2, and adds the further feature that each of the host computing system 106 includes a reflector component 114 that is adapted to passively reflect the delay request message initiated from the grandmaster 102, back to the grandmaster 102.

Figure 5:
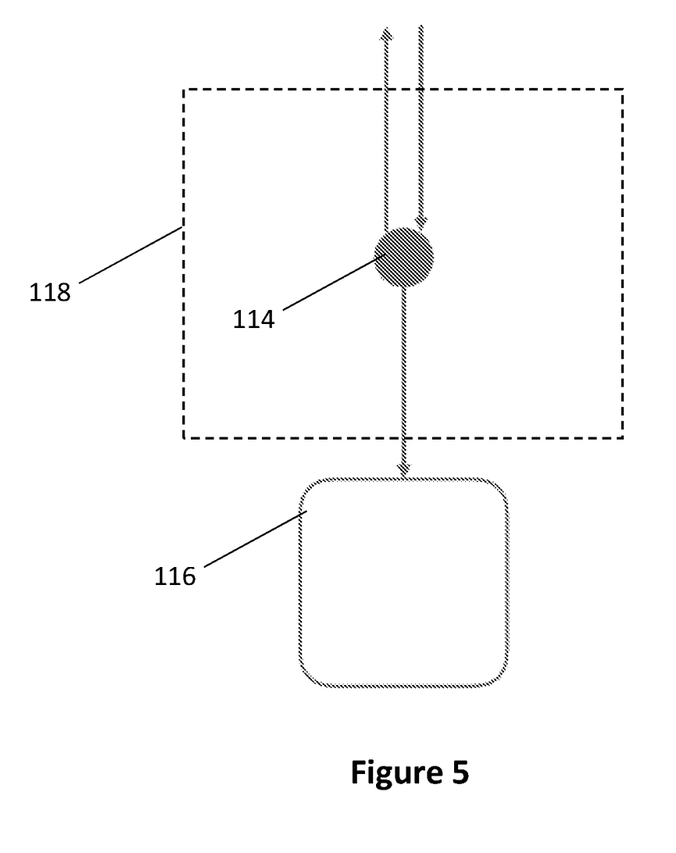
FIG. 5 is a schematic depiction of a data flow between a physical layer and a node in one embodiment.
Figure 6:
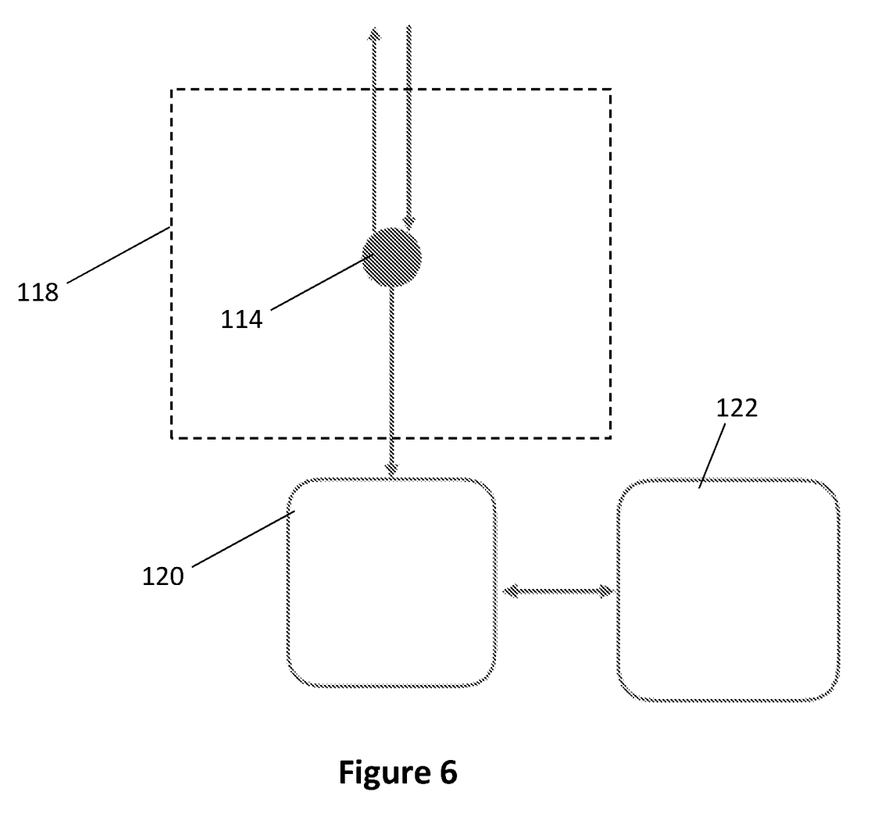
FIG. 6 is a schematic depiction of a data flow between a physical layer and a node in a different embodiment.

The message handling which occurs in the process described above in relation to FIG. 4, is schematically depicted in FIG. 5 and FIG. 6.

The passive reflection of the request data means that there is no queuing or buffering of the request data, which could otherwise create jitter in the data routing. With the passive reflection, data is reflected bit by bit. That is, every bit of data that that arrives at the host computing system 106 gets sent back out again without first being processed at the host computing system 106.

This is implemented by, for example, a PMA (physical medium attachment) loop back, which is a low level bit by bit loop back. It functions as a transceiver, without decoding the data. The PMA can be an electrical or optical reflector, although an optical reflector would be more expensive. Data is also permitted to passes through the PMA. Thus, in the event of a receipt of a time synchronisation request, the PMA will pass the time synchronisation request to be processed by the time synchronisation logic (see FIGS. 5 and 6) associated with the host computing system 106.

The PMA can be in the form of a transceiver or a transmitter-receiver, or any other component capable of the aforementioned functionality. The passive reflector 114 is embedded in a pluggable component 118 (see FIG. 5) such as a small form factor pluggable or "SFP", which is a small module that is insertable or otherwise connectable to the network interface card. E.g., it is plugged into the network interface card. Different types of SFP, such as but not limited to, a quad channel small form factor pluggable (QSFP) or an enhanced small form factor pluggable (SFP+), can also be used. The network card can be the standard network card, and does not need to be replaced in order for the reflector function to be implemented. It can receive PTP format messages and be still be used with the proposed protocol, by modifying the software implementation at the host computing system to accommodate or implement the proposed protocol.

Alternatively, the hardware or firmware circuitry of the network interface card can be modified to implement the passive reflection functionality. Thus the passive reflector component 114 is the part of the modified circuitry that implements the passive reflection. However, doing so would require new network interface cards to be issued to the users/clients, and is less preferable in cases where it is desired to retrofit existing network interface cards to adopt the proposed protocol.

In the embodiments shown in FIGS. 4 to 6, there is no requirement for a hardware or software implementation at the host computing systems 106 to actively process the delay requests. Thus, the jitter in the overall network is reduced.

Under the conventional PTP protocol, the clients are responsible for maintaining their own state—that is, maintain the implementation to comply with the PTP protocol, to, e.g., send delay requests, manage delay responses, respond to synchronisation messages, etc. The implementation adds complexity which may also contribute to the further delay or inaccuracy in network time synchronisation.

By using simple hardware components for some or all of the protocol processes, the implementation is simplified. The delay request implementation is handled by the hardware as shown in FIGS. 4 to 6.

As mentioned, the passive reflector 114 allows data to pass through, thus a time synchronisation request can still reach the destination for processing.

It is preferred that the system state information, relating to the host computing systems 106, is stored at the grandmaster 102. The system state will include, but is not limited to, a list of host computing systems and their relative path delays as calculated in the manner described above with reference to FIG. 2.

It is preferred that some or all of the management of the system state information, the complexity of protocol implementation and adherence thereto, be kept at the grandmaster level. In the embodiment shown in FIG. 4, the complexity involved in addressing the delay requests is reduced to a passive hardware circuitry at the host computing system.

It is further preferred that the remaining complexity is retained at the grandmaster 102. For instance, the grandmaster 102 will keep track of the delays in the network.

In the embodiment shown in FIG. 5, the host computing system includes or is associated with a time synchronisation logic module 116 which implements the time synchronisation logic. This is a simple logic located at the client's location. The only requirement is that it receives the timestamp data. The module 116 can be, e.g., a Field Programmable Gate Array (FPGA) or an application specific integrated circuit (ASIC). It can also be a pluggable component which works with an existing network interface card or which is embedded in a modified network interface card. If the time delay information associated with each node or host computing system is managed by the grandmaster, then the logic would only need to be a slave clock to the grandmaster 102.

Alternatively, as shown in FIG. 6, the time synchronisation logic is software implemented, and the existing network interface card 120 remains. A high precision time protocol (HTPT) software 122 which embodies the proposed protocol controls the time synchronisation function.

Figure 7:
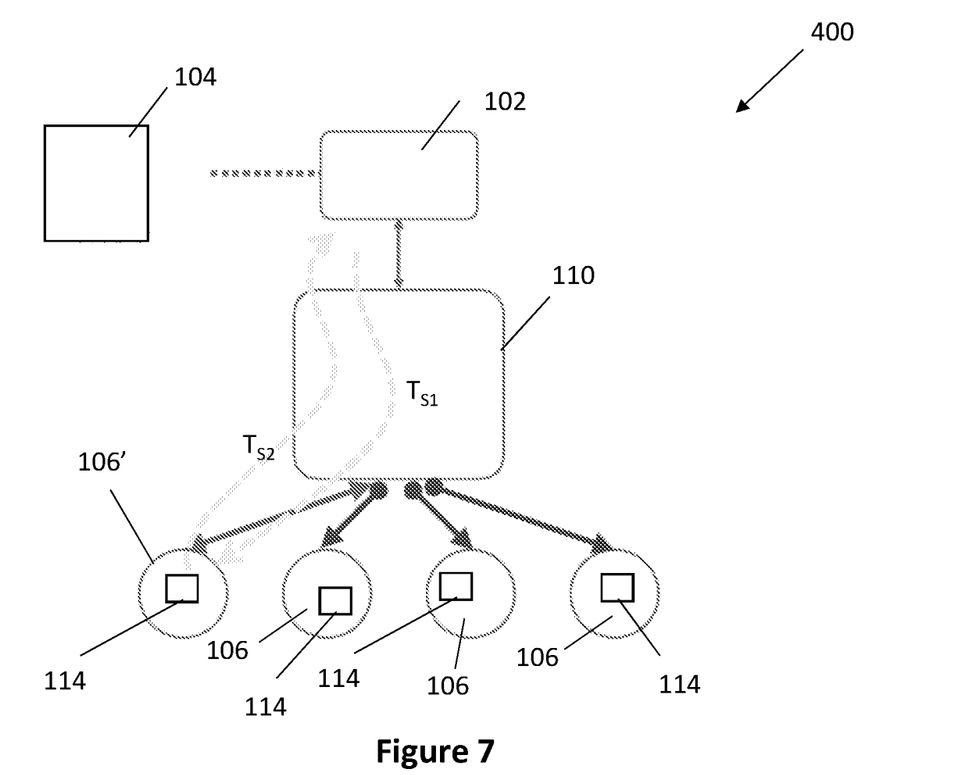
FIG. 7 is a is a schematic depicting a High Precision Time Protocol in accordance with a further embodiment of the present invention.

FIG. 7 schematically depicts an improved high precision time protocol 400 in accordance with a further embodiment which is the preferred embodiment, combining the features discussed above with reference to FIGS. 2 to 6. It also offers the best time precision compared with the previously described embodiments. In the testing performed, it has been found that a precision of +/−50 picoseconds (PS) can be achieved.

The variation in the implementation discussed thus are also included in the variation in the scope of the implementation for the most preferred embodiment. In FIG. 7, the dashed arrows represent the protocol where the grandmaster 102 initiates the delay request message, and receives the delay response message. The delay response message is a passive reflection from the reflector 114 back to the grandmaster 102. The transport of these messages, as well as of the time synchronisation request (and if required, the follow up message), is enabled over a physical switch layer 110.

Depending on the equipment requirement—i.e. preference to replace client equipment or issue new equipment, and/or the protocol management requirement, a more specific variation of the generally most preferred embodiment can be selected.

In the above, the "Grandmaster" 102 can be a software program or module which is running on a server or host device, as long as that device has or is in communication with a high precision clock, and can timestamp messages going in and out. For example, the grandmaster 102 can be provided by a host or server computer having a HPT network card (ExaNIC HPT)—that can provide the high quality timestamps to send/receive message events. Some components of the protocol can be software implemented on the computer which hosts the grandmaster 102.

Variations and modifications may be made to the parts previously described without departing from the spirit or ambit of the disclosure. For instance, variations in the implementation of FIG. 4 are discussed with reference to FIGS. 5 and 6. In some embodiments, the passive reflection may be performed at the server 102 instead of the host computing systems.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of operating a network, the network having one or more nodes which are in communication with a server, the server including or being in communication with a high precision time source, the method comprising estimating a time delay between the server and each node, which comprises:

configuring a physical layer for transport of time protocol data between the server and each node of the one or more nodes;

initiating a delay request from the server which is transported over the physical layer to a node of the one or more nodes, wherein a first timestamp for the delay request is recorded from the high precision time source;

receiving at the server a delay response from the node receiving the delay request, wherein a second timestamp for the delay response is recorded from the high precision time source, wherein the delay response is a passive reflection of the delay request from the node back to the server; and estimating the time delay between the server and the node from half of a time difference between the first and second timestamps.

2. The method of claim 1, wherein each node of the one or more nodes includes a passive reflector which is adapted to both passively reflect data received from the server back to the server and let received data through to the node.

3. The method of claim 2, wherein the passive reflector is built into a network interface card at the node.

4. The method of claim 2, wherein the passive reflector is embedded into a component insertable or otherwise connectable to a network interface card at the node.

5. The method of claim 4, wherein the component is a type of a small form pluggable.

6. The method of claim 1, wherein the physical layer is configurable to provide a physical connection for bidirectional communication between the physical layer and one of the one or more nodes at a time, and one-way communication from the physical layer to remaining one(s) of the one or more nodes.

7. The method of claim 6, wherein estimating the time delay between the server and each node includes: sending the delay request to each node of the one or more nodes, and receiving the delay response from each node of the one or more nodes, one node at a time.

8. The method of claim 7, wherein the physical layer comprises a matrix of switches, optical splitters, or a combination of switches and optical splitters.

9. The method of claim 1, further including issuing a time synchronisation request to the one or more nodes.

10. The method of claim 9, wherein the time synchronisation request is handled by a time synchronisation logic.

11. The method of claim 10, wherein the server stores the time delay for each node, and the time synchronisation logic is a slave clock logic.

12. The method of claim 10, wherein the time synchronisation logic is implemented in hardware connectable or embedded in network interface cards at the one or more nodes.

13. The method of claim 10, wherein the time synchronisation logic is implemented in software.

14. The method of claim 1, wherein a time protocol data transport between the server and the one or more nodes is enabled over the physical layer, which is reconfigurable to provide a physical connection, over which bidirectional communication between the physical layer and one of the one or more nodes is enabled, one node at a time.

15. A system comprising:

a network having one or more nodes; and a server in communication with the one or more nodes, and including or being in communication with a high precision time source, wherein the server estimates a time delay between the server and each of the one or more nodes in the network by:

configuring a physical layer for transport of time protocol data between the server and each of the one or more nodes;

initiating a delay request from the server which is transported over the physical layer to a node of the one or more nodes, wherein a first timestamp for the delay request is recorded from the high precision time source;

receiving at the server a delay response from the node receiving the delay request, wherein a second timestamp for the delay response is recorded from the high precision time source, wherein the delay response is a passive reflection of the delay request from the node back to the server; and estimating the time delay between the server and the node from half of a time difference between the first and second timestamps.

16. The system of claim 15, wherein each node includes a passive reflector which is adapted to both passively reflect data received from the server back to the server and let received data through to the node.

17. The system of claim 16, wherein the passive reflector is built into a network interface card at the node.

18. The system of claim 16, wherein the passive reflector is embedded into a component insertable or otherwise connectable to a network interface card at the node.

19. The system of claim 15, wherein the server estimates the time delay between the server and each of the one or more nodes in the network by:

sending the delay request to each node of the one or more nodes; and receiving the delay response from each node of the one or more nodes, one node at a time.

20. The system of claim 15, wherein the physical layer comprises a matrix of switches, optical splitters, or a combination of switches and optical splitters, which are reconfigurable to provide a physical connection over which bidirectional communication between the physical layer and one of the one or more nodes is enabled at a time, and over which one-way communication from the physical layer to remaining one(s) of the one or more nodes is enabled.

* * * * *